US008889052B2

(12) United States Patent
Kitchloo et al.

(10) Patent No.: US 8,889,052 B2
(45) Date of Patent: Nov. 18, 2014

(54) UNCOATED, CORROSION RESISTANT RESIN DELIVERY SYSTEM

(75) Inventors: Paresh Kitchloo, North Attleboro, MA (US); Boris Serebrennikov, Shrewsbury, MA (US); Timothy Murray, Warren, MA (US); Séverine Tisné, Brookfield, MA (US)

(73) Assignee: Gentex Optics, Inc., Carbondale, PA (US)

( * ) Notice: Subject to any disclaimer, the term of this patent is extended or adjusted under 35 U.S.C. 154(b) by 363 days.

(21) Appl. No.: 13/350,573

(22) Filed: Jan. 13, 2012

(65) Prior Publication Data

US 2013/0181362 A1 Jul. 18, 2013

(51) Int. Cl.
*B29C 45/00* (2006.01)

(52) U.S. Cl.
USPC ......... 264/328.1; 264/349; 425/207; 425/585

(58) Field of Classification Search
CPC ............ B29C 47/0844–47/0849; B29C 45/60; B29C 45/62
USPC .................. 264/1.1, 328.1, 349; 425/207, 585
See application file for complete search history.

(56) References Cited

U.S. PATENT DOCUMENTS

| | | | |
|---|---|---|---|
| 3,773,451 A | 11/1973 | Bielfeldt et al. | |
| 3,937,776 A | 2/1976 | Hold et al. | |
| 4,285,600 A | 8/1981 | Kruder | |
| 4,802,140 A | 1/1989 | Dowling | |
| 4,855,404 A * | 8/1989 | Betso et al. | 528/490 |
| 4,908,169 A * | 3/1990 | Galic et al. | 264/410 |
| 4,949,836 A | 8/1990 | Schostek | |
| 5,073,313 A * | 12/1991 | Umemura et al. | 264/1.1 |
| 5,160,690 A | 11/1992 | Cox, Jr. et al. | |
| 5,215,764 A | 6/1993 | Davis et al. | |
| 5,244,605 A * | 9/1993 | Umemura et al. | 264/1.1 |

(Continued)

FOREIGN PATENT DOCUMENTS

DE 202009015256 4/2010

OTHER PUBLICATIONS

International Search Report and Written Opinion from International Stage Application No. PCT/US2013/020725, dated Jun. 4, 2013.

(Continued)

*Primary Examiner* — Jill Heitbrink
(74) *Attorney, Agent, or Firm* — Keusey & Associates, P.C.

(57) ABSTRACT

An apparatus and method for producing defect-critical articles from a molding resin comprising at least 98% clear polymer and additives including a heat stabilizer and a UV blocker in an injection molding machine. According to the apparatus, there is provided an injection molding machine in combination with a molding resin. The injection molding machine's resin delivery assembly is made from a powder metallurgy formed into solid non-coated parts having a Chromium-Vanadium (Cr/V) blend. As the molding resin interacts with the resin delivery assembly, the resin only contacts the solid non-coated parts whereby the resin experiences less degradation and provides improved quality for the defect-critical articles. The method includes the steps of plasticizing, injecting, and cooling. During the plasticizing and injecting steps, the molding resin only contacts solid non-coated parts made from a powder metallurgy material containing a Chromium-Vanadium (Cr/V) blend thereby producing reduced defect articles.

23 Claims, 5 Drawing Sheets

(56) References Cited

U.S. PATENT DOCUMENTS

| | | |
|---|---|---|
| 5,520,454 A | 5/1996 | Laing et al. |
| 5,565,277 A | 10/1996 | Cox, Jr. et al. |
| 5,599,098 A | 2/1997 | Christie |
| 5,615,406 A | 3/1997 | Sasaki et al. |
| 5,984,517 A | 11/1999 | Yamagiwa et al. |
| 6,139,179 A | 10/2000 | Christiano et al. |
| 6,227,692 B1 | 5/2001 | Heathe |
| 6,634,781 B2 | 10/2003 | Bowens et al. |
| 6,786,630 B2 | 9/2004 | Haberer |
| 7,004,739 B2 | 2/2006 | Thomson |
| 7,021,917 B2 | 4/2006 | Uchiyama et al. |
| 7,032,843 B1 | 4/2006 | Johnson et al. |
| 7,134,868 B2 | 11/2006 | Babin et al. |
| 7,296,920 B2 | 11/2007 | Zhang et al. |
| 8,066,920 B2 * | 11/2011 | Gazaille et al. ............. 264/40.1 |
| 2006/0023565 A1 | 2/2006 | Mueller |
| 2007/0023107 A1 | 2/2007 | Westin |
| 2009/0098234 A1 | 4/2009 | Graetz et al. |
| 2009/0315219 A1 | 12/2009 | Shelby et al. |

OTHER PUBLICATIONS

Mould Industries, "Supply M390 M390 tool steel hardness, corrosion-resistent use," Sep. 26, 2011, retrieved from the Internet Apr. 16, 2013, http://shtechdoc.en.b2b168.com/shop/supply/9923432.html.

Bohler, "Kunststoffformenstahle plastic mould steels," Apr. 30, 2006, retrieved from the Internet Apr. 12, 2013, http://pdf.directindustry.com/pdf/bohler-edelstahl/bohler-plastic-mould-steels/29942-155380-.12.html.

"ELMAX SuperClean3 Powder Metallurgy Stainless Mould Steel" Uddeholm, Nov. 3, 2003.

* cited by examiner

UNCOATED, CORROSION RESISTANT RESIN DELIVERY SYSTEM

BACKGROUND OF THE INVENTION

1. Field of the Invention

The invention relates to an uncoated, corrosion resistant resin delivery system that reduces thermal and shear induced degradation.

2. The Prior Art

Injection molding screws are rotatably disposed within heated barrels to process resin for injection through a nozzle. These resin delivery systems were initially formed from steel. To improve the performance, the steel base alloy was coated with various materials.

According to U.S. Pat. No. 6,634,781 the resin delivery system is formed from three layers including a base, a bond coat layer and a wear resistant coating. The base alloy may be formed from corrosion resistant alloys such as alloy steels, cast or wrought iron, low and high carbon steels, nickel based alloys and stainless steel. An intermediate layer was a coated on to the base alloy. The intermediate or bond coating layers may be made from a nickel based alloy that is welded on to the base alloy. The bond coating layer has a coefficient of thermal expansion which is about the same or less than the base alloy, and higher than the wear resistant coating. The wear resistant coating comprises a fused ceramic layer and may include materials such as chromium oxide, aluminum oxide, alumina titania, zirconium oxide, magnesium zirconate, yttria-stabilized zirconium oxide, magnesium aluminate, tungsten carbide, tungsten-chromium carbide, chromium carbide and tungsten-titanium carbide.

According to U.S. Pat. No. 6,786,630 an alternate three layer system comprises a base alloy, an intermediate layer of magnetically conductive metallic material applied by a thermal spraying process. The wear resistant layer is made up of at least 30% molybdenum or made almost entirely of molybdenum, also applied by a thermal spraying process.

U.S. Pat. No. 5,565,277 discloses a barrel comprising a bi-metallic construction, with a base metal and a coating layer consisting of microalloyed steel. The preferred micro-alloyed steels contain 0.34 to 0.40% Carbon, 0.15 to 0.80% Silicon, 1.20 to 1.65% Manganese, 0.08 to 0.13% Vanadium and the balance iron. The microalloyed steel was applied via a centrifugal casting process.

U.S. Pat. No. 7,134,868 discloses a coated nozzle having steel base material. An intermediate layer is coated with a diamond-type layer. The intermediate layer may be made from silicon, titanium or nickel formed by vacuum deposition or chemical vapor deposition. Another option would be molybdenum applied by ionization evaporation if greater adhesion is required. The diamond-type coating can be a composite type (metal and diamond mixture) or a diamond depositing type (amorphous and polycrystalline).

As will be described more fully below, all systems employing a coating have limitations. The prior art coatings were developed to improve the mechanical surface properties of resin delivery systems in a cost effective manner. However, even the most durable coatings eventually begin to break down, causing resin degradation and molding defects. These problems are exacerbated by increasing the temperature in the barrel.

Accordingly, it would be desirable to provide a resin delivery system that avoids the drawbacks of coated metals and improves the quality of defect-critical articles.

SUMMARY OF THE INVENTION

It is therefore an object of the present invention to provide a solid, non-coated resin delivery system.

It is another object of the invention to provide a solid, non-coated screw with a configuration and operation that limits the amount of shear that the resin is exposed to.

It is a further object to select a powder metallurgy material for the solid, non-coated resin delivery system to reduce the degradation of the resin.

It is yet another object to improve the quality and yield of defect-critical articles, such as optical articles, for example, ophthalmic lenses, like plano, finished, and semi-finished lenses and lenses including tints, and functional films like polarized films.

These and other related objects are achieved according to a first embodiment of the invention which provides an apparatus for producing reduced defect articles. The apparatus produces such articles from a molding resin comprising at least 98% clear polymer and additives including a heat stabilizer and a UV blocker in an injection molding machine. The apparatus includes an injection molding machine in combination with molding resin. The injection molding machine has a hopper, a resin delivery system and a mold. The resin delivery assembly includes a hollow cylindrical barrel and a screw rotatably disposed within said barrel and terminating in a nozzle. The resin delivery assembly is made from a powder metallurgy formed into solid non-coated parts having a Chromium-Vanadium (Cr/V) blend of about 18% Cr and about 3% V. A molding resin is fed from the hopper to the resin delivery assembly and injected via said nozzle into the mold, wherein between the hopper and the mold, the resin only contacts solid non-coated parts whereby the resin experiences less degradation and provides improved quality of the defect-critical articles.

The Cr/V blend reduces chlorine induced degradation of the metallic resin delivery assembly. The powder metallurgy provides a monolithic part which reduces hot spots thereby minimizing additive degradation and film formation. The solid parts are less susceptible to micro-cracks thereby minimizing nucleation sites for resin deposit and degradation. The powder metallurgy further includes about 1.7% Carbon, about 0.8% Silicon, about 1% Molybdenum, about 0.3% Manganese with no detectable amounts of Nickel, Tungsten, Sulfur or Phosphorus.

The molding resin is one of polycarbonate, thermoplastic polyurethane, PMMA, PMMA copolymers, polyesters, nylons, PC-polyester blends and PC-polyester copolymers. The additives further include one or more of a mold release agent, a dye, and a colorant. The defect-critical article is selected from the group consisting of a medical device, storage media, an optical article, an ophthalmic lens, a plano lens, a finished lens, a semi-finished lens, a tinted lens, a lens including a functional film, and a polarized lens.

The barrel and screw includes a feed zone, a transition zone, and a metering zone in which said transition zone comprises about 50% of the length of the resin delivery assembly. The transition zone is centered along the length of the resin delivery assembly, wherein the transition zone provides more gradual melting, improves melt homogeneity and additive blending while avoiding vigorous mixing thereby reducing heat and shear induced degradation and improving the yellowness index of the defect critical article.

The resin delivery system further includes a heater to control the temperature of the barrel. The screw configuration and operation prevents any molding resin from being subject to shear rates above about 30 s$^{-1}$ within the transition and metering zone, in the channel between the screw root and the barrel while said heater maintains a barrel temperature as a function of the molding resin's rheological properties to adjust the molding resin's viscosity below about 2,000 Pa·s. In addition, the screw configuration and operation prevents any molding resin from being subject to shear rates above about 750 s$^{-1}$ within the transition and metering zone, in the area between the top of the flights and inner lining of the barrel, while said heater maintains a barrel temperature as a function of the molding resin's rheological properties to adjust the molding resin's viscosity below about 1,000 Pa·s. Furthermore, the heater maintains a barrel temperature above 250 degrees C. for polycarbonate and a barrel temperature below 250 degrees C. for thermoplastic polyurethane.

The resin delivery system further includes a screw tip and a non-return ring. The injection molding machine includes a screw actuator to move the screw axially within the barrel to prevent the molding resin from being subject to shear rates above about 15,000 s$^{-1}$ as it passes through the nozzle to decrease viscosity below about 500 Pa·s to improve flow into the mold.

The objects according to the invention are further achieved by a second embodiment of the invention relating to a method for producing reduced defect articles in an injection molding machine using a molding resin having at least 98% clear polymer and additives including a heat stabilizer and a UV blocker. The method includes the first step of plasticizing the molding resin by feeding the molding resin (a) from a hopper (b) along a barrel and screw and (c) through a nozzle. Next the plasticized resin is injected from the nozzle into a closed mold. Lastly, the plasticized resin is cooled until it solidifies to withstand opening of the mold without deforming. Between the hopper and the mold, the molding resin only contacts solid non-coated parts made from a powder metallurgy material containing a Chromium-Vanadium (Cr/V) blend above about 20% by weight of the material thereby producing a reduced defect article.

The barrel and screw includes a feed zone, a transition zone and a metering zone in which the transition zone comprises about 50% of the length of the barrel and screw. The transition zone is centered along the length of the barrel and screw, wherein the extended transition zone provides more gradual melting, improves melt homogeneity and additive blending while avoiding vigorous mixing thereby reducing heat and shear induced degradation and improving the yellowness of the article.

The plasticizing step includes configuring and operating the screw so that the molding resin is not subject to shear rates above about 30 s$^{-1}$ within the transition and metering zone in the channel in combination with setting the temperature within the barrel to adjust the molding resin's viscosity below about 2,000 Pa·s. In addition, the plasticizing step includes configuring and operating the screw so that the molding resin is not subject to shear rates above about 750 s$^{-1}$ within the transition and feed zone above the flights and the barrel in combination with setting the temperature within the barrel to adjust the molding resin's viscosity below about 1,000 Pa·s.

The molding resin comprises polycarbonate and the temperature is set between 250 and 340 degrees C. Alternatively, the molding resin comprises thermoplastic polyurethane and the temperature is set between 210 and 250 degrees C. The injecting step further includes configuring and operating the screw so that the plasticized resin is not subject to shear rates above about 15,000 s$^{-1}$ as it passes through the nozzle to decrease the viscosity below about 500 Pa·s to improve flow into the mold.

The molding resin may be any suitable engineering resin or optical grade resin. Certain useful resins are polycarbonate, thermoplastic polyurethane, PMMA, PMMA copolymers, polyesters, nylons, PC-polyester blends and PC-polyester copolymers. The additives further include one or more of a mold release agent, a dye, and a colorant. The powder metallurgy further includes about 1.7% Carbon, about 0.8% Silicon, about 1% Molybdenum, about 0.3% Manganese by weight with no detectable amounts of Nickel, Tungsten, Sulfur or Phosphorus. The defect critical article is selected from the group consisting of a medical device, storage media, an optical article, an ophthalmic lens, a plano lens, a finished lens, a lens including a functional film, a polarized lens and a semi-finished lens.

BRIEF DESCRIPTION OF THE DRAWINGS

The invention will now be described in connection with the appended drawings which form part of this specification. In the drawings, like numbers refer to similar elements throughout the views.

DETAILED DESCRIPTION OF THE PREFERRED EMBODIMENTS

Figure 1:
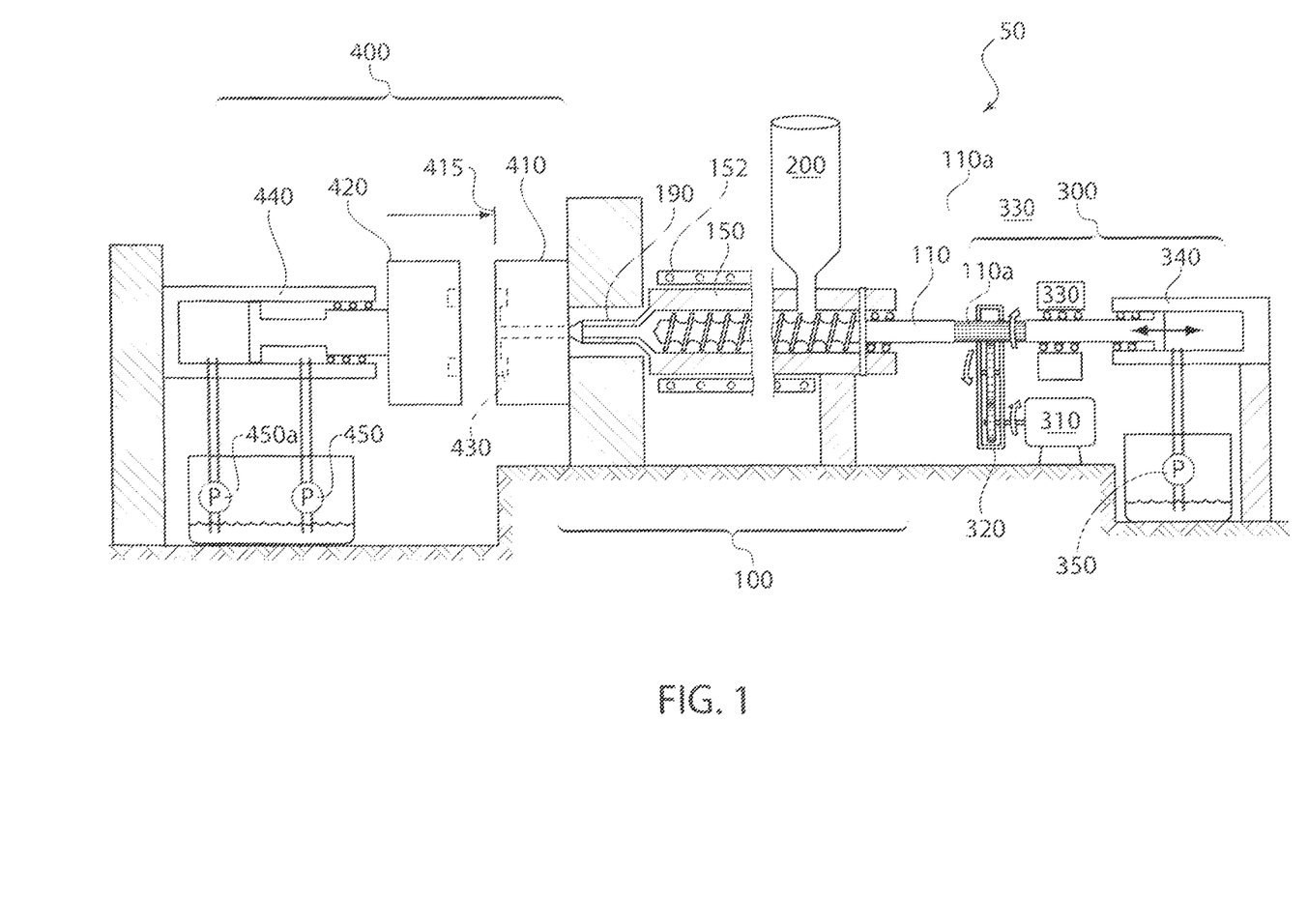
FIG. 1 is a schematic drawing of an injection molding machine.

Referring now in detail to the drawings, and in particular FIG. 1, there is shown a schematic drawing of an injection molding machine 50. As an overview, the major components of the injection molding machine include a screw and barrel 100, a reciprocating drive unit 300, and a mold section 400. The screw and barrel assembly 100 receives pellets of thermoplastic material from hopper 200 and heats and compresses the material into a molten resin.

Within the barrel, the screw 110 is rotated to transport the pellets from the right side where they are introduced from the hopper 200. As the pellets move towards the left side, they are compressed as the screw and barrel cooperatively provide a decreasing volume in the direction toward the nozzle. Screw rotation is achieved by a motor 310 which transmits rotational motion through a transmission 320 to a splined shaft section of screw 110. A bearing 330 supports a section of the screw, which is subject to left-right reciprocal movement by a screw-side piston cylinder unit 340. The right end of screw 110 serves as the piston in the schematic drawing, although other suitable configurations are possible. A hydraulic pump 350 selectively pressurizes and de-pressurizes the cylinder to move the screw 110 back and forth within sleeve 150.

As the thermoplastic material moves through barrel 150 from right to left, the material becomes molten and builds up under high pressure within nozzle 190. The hydraulic pump 350 is de-energized whereby screw 110 is forced back to the right as the molten material builds up in the nozzle. Once a charge of molten resin is accumulated, motor 310 is deactivated and the screw stops turning. A barrel heater 152 is provided to heat barrel 150. A suitable thermostat (not shown for the sake of clarity) may be used to control the heater and maintain the temperature of the barrel at a predetermined level.

The mold section 400 includes a fixed mold half 410 and a movable mold half 420 which opens and closes to meet fixed mold half 410 along parting line 415. The movable mold half 440 is coupled to a mold-side piston cylinder unit 440. A second set of hydraulic pumps P1 450a and P2 450b are selectively activated to extend and retract the piston, thereby opening and closing the mold section. FIG. 1 shows the mold in the open position. Moveable mold half 420 will slide to the right to contact stationary mold half 410 at parting line 415.

In use, the mold section is closed by activating pump (P1) 450a and the screw is rotated to build up a charge of molten resin in nozzle 190. The screw rotation is halted, and the first hydraulic pump 350 is activated to build up pressure in the screw-side piston cylinder unit 340, causing the screw 110 to move to the left, thereby forcing the molten resin through the nozzle into the closed mold cavity 430.

Accordingly, it can be seen that between hopper 200 and mold 400, the thermoplastic material is only in contact with the screw 110, barrel 150 and nozzle 190. The process of heating and compressing the thermoplastic material is frequently referred to as plasticizing the resin. When manufacturing defect critical parts via injection molding, the process of plasticizing the resin is critical because the material can easily be overheated, contaminated, subject to oxidation or other forms of degradation. In manufacturing optical articles, such as ophthalmic lenses, material degradation can cause defects in the optical articles.

A common source of contamination is chlorine induced corrosion of the metal surfaces of the screw and barrel. Chlorine can be introduced into the barrel from a variety of sources. Some molding resins such as PVC contain chlorine as part of the polymer structure. Some resins use halogenated solvents as a component in the polymer synthesis. In other cases, chlorine containing compounds are either part of the synthesis route or a by-product of the synthesis route. Regardless of the source, chlorine (even at ppm levels) can combine with moisture to form hydrochloric acid. Moisture can be introduced into the barrel by the resin. Most plastic resins are hygroscopic, meaning they absorb moisture from humid ambient air. The moisture is subsequently released in the barrel. Resins which are non-hygroscopic can still carry surface moisture into the barrel. Under the heat and pressure of the barrel environment, the hydrochloric acid will attack the screw and barrel surfaces causing corrosion. As the screw and barrel coating corrodes, bits of coating may flake off causing defects in the molded product. Alternatively, polymer may become entrapped in areas where the coating has pitted. Over time this entrapped polymer will degrade and flake off also causing defects. To address these problems, the apparatus according to the invention utilizes a screw, barrel and nozzle which are solid, non-coated parts made from a stainless steel having a chromium/vanadium blend over 20%. More specifically, the blend comprises about 18% chromium and about 3% vanadium. Unless indicated otherwise, all component percentages are by weight. One material having the appropriate Cr—V blend is sold under the tradename Elmax available from Uddeholm of Sweden.

High compression of the resin causes an interaction between the hot polymer melt and the metal surface of the screw, barrel and nozzle. This interaction is dependent on a wide variety of factors as follows: the polymer chemistry; the additives present in the polymer; the surface chemistry of the metal; thermal properties of the polymer and the melt; and the interaction time between the melt and the metal. Of particular concern are the additives that are blended into the polymer as part of the stabilization package. While the additives are engineered to reduce degradation and improve processability of the resin, the additives themselves can degrade causing defects. For example, certain additives increase the thermal and UV stability of the resins. Other additives comprise mold release agents which are needed to insure the parts separate cleanly from the mold surfaces. Conventional screws feature coated surfaces that cause additive degradation when the stabilized resins are heated by contact with such coated surfaces.

Another aspect of this degradation process is the formation of a polymer film on the coated surfaces. The more monolithic the metal is, the lower the tendency of film formation. The term "monolithic" refers to the physical distribution of the various components within the metal material. In other words, the more monolithic the metal, the better the components are distributed throughout the metal. Metals that have a low monolithic measure are characterized by larger regions of discrete materials. In other words, these materials form islands within the metal. Metals that have a high monolithic measure are characterized by smaller regions of discrete materials, where the various components are more integrated within the alloy mixture. By integrated, we mean that the components are smaller in size and more evenly blended.

Metals with a low monolithic measure have larger domains of components which create hot-spots. These hot-spots, or more accurately micro hot-spots, lead to increased polymer-metal interactions. These interactions cause resin degradation at the interface, which eventually turns to degraded film. Typical chrome-plated screws can develop a film within a month of use in production. According to the invention, a powder metallurgy having a Cr—V blend is formed in solid, non-coated mold parts, namely, the screw, barrel and nozzle. It is believed that the powder metallurgy leads to mold parts having a high monolithic measure. Experiments with the powder metallurgy parts indicate they can be used for more than a year without forming a polymer film. Other components of the solid non-coated parts include a Carbon content below 3.4%, or a C content between about 1.1 and 2.5%, preferably about 1.7%. Also a Silicon content below 1.6%, or a Si content between about 0.5 and 1.2%, preferably about 0.8%. In addition, a Molybdenum content below 2%, or a Mo content between about 0.6 and 1.5%, preferably about 1%. Also a Manganese content below 0.6%, or a Mn content between about 0.2 and 0.45%, preferably about 0.3%. The solid non-coated parts possess no significant or detectable amounts of Nickel (Ni), Tungsten (W), Sulfur (S) or Phosphorous (P). Unless otherwise stated, percentages are by weight.

The Cr—V blend powder metallurgy used to make monolithic, non-coated mold parts can be effectively used to process a range of polymers in defect-critical applications. Such applications include molding of optical articles, like ophthalmic lenses, medical devices, storage media, and others. Polymers that may be used to mold clear parts include polycarbonate (PC), thermoplastic polyurethane (TPU), polyesters, nylons, PC-polyester blends and copolymers. The Melt Index of these resins can vary from less than 1 to 150. The lower end of the Melt Index is for applications requiring greater strength such as impact resistance, while higher Melt Index is for applications having thin cavities or requiring lower processing viscosity. Injection molding times can vary from 2 seconds to 10 minutes. While TPU's do not require mold release agents, all of the polymers listed require a stabilization package including a heat stabilizer to maintain good color of the resulting parts. They further require UV blockers to provide the polymer with UV protection. To insure good surface replication release agents are added. For color requirements various dyes and pigments may be added. For industrial processing of polymers containing stabilization packages, the Cr—V blend powder metallurgy forming monolithic, non-coated mold parts is an excellent solution for reducing causes of polymer and additive degradation. This leads to lower costs and a higher acceptance rate of defect critical parts.

In molding optical articles, like lenses, it is important to have all the resin pellets melted and to have the stabilizers completed mixed throughout the resin. One measure of resin processing is referred to as the "melt homogeneity." A homogeneous melt minimizes the presence of unmelted polycarbonate (or other resin) in the melt that is delivered into the molding cavities. This is critical in ophthalmic applications where micro-pockets of unmelted polycarbonate stand out as optical defects which cause lens rejects. It is also believed that the same factors that lead to a favorably high melt homogeneity can improve the uniform distribution of stabilizers in the melt. Stabilizers are usually added in powder form during the extrusion process, that is, the manufacturing process of the resins. Stabilizers may remain intact during the extrusion process. If these powder clumps make it to the molding screw, insufficient mixing can lead to molding defects.

The melt homogeneity and stabilizer blending can both be solved by providing adequate mixing as the resin passes through the screw and barrel. One possible solution is to provide a more vigorous mixing. However, vigorous mixing can introduce high levels of shear and heat to the resin. Polycarbonate and other polymers used in manufacturing clear products are particularly sensitive to high shear and high temperatures. If polycarbonate is subject to high shear, the polymer chains can be severed thereby reducing the mechanical strength of the material. If the resin is subject to high temperatures, the polymer may degrade causing a yellowing in the final product which will fail to meet strict color requirements for clear lenses.

A better solution proposed by this application is to provide gentler mixing over a longer distance. While a general purpose (GP) screw has a nominal length to diameter (L/D) ratio of 20:1, a screw used to process polycarbonate (PC) would have a higher L/D ratio up to 24:1. The L/D ratio according to an embodiment of the invention is in the range of about 20:1 to about 24:1, more particularly about 22:1 to 23:1 depending on other processing conditions and the polymer being processed. With the greater length, it is possible to provide a longer transition zone.

Figure 2:
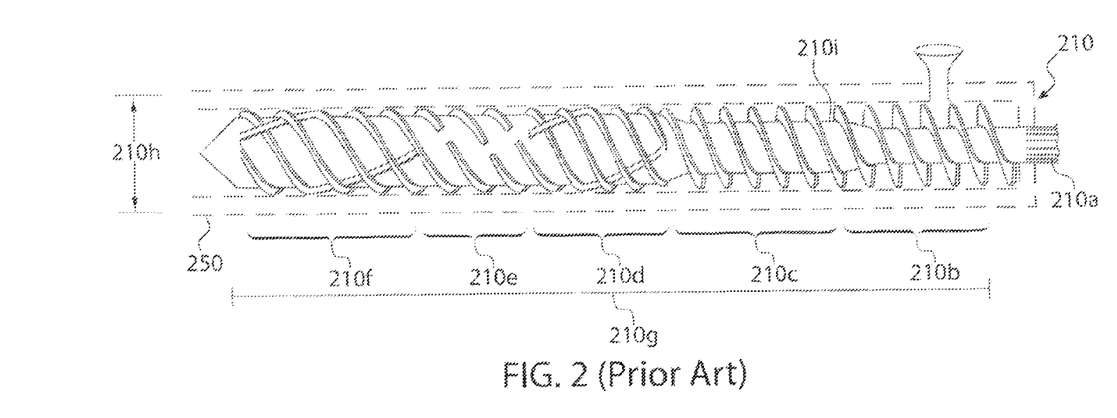
FIG. 2 is an injection molding screw according to the prior art.

Typically, a GP screw as shown in FIG. 2 has a feed zone, a transition zone and a metering zone, with the transition zone being a fraction of the total length. The prior art screw 210 is shown with the splined shaft section 210a, which engages the transmission for rotating the screw within prior art barrel 250. The transmission contacts a portion of the splined shaft section 210a. The screw is configured for axial movement, first to the right to build up a charge of plasticized resin in front of the screw in the nozzle section. When the mold is closed and ready-to-mold, the screw can be moved axially to the left to push the charge through the nozzle in to the mold. The extended length of the splined shaft section 210a allows the screw to move while still remaining in rotational coupling with the transmission. This complete assembly which provides axial and rotational movement of the screw is collectively referred to as the reciprocating drive unit 300.

The feed zone 210b is located in the vicinity of the hopper 200 in order to feed the pellets to the left in to the barrel. The screw has flights configured as raised helical lands which force the pellets in an axial direction when the screw is rotated. The screw portion residing within the barrel has a total length of 20 units. In this embodiment the feed zone 210b is about 5/20 of the total length and the transition zone 210c is about 5/20 of the total length. The metering zone is by far the largest comprising a first metering section 210d, a mixing section 210e and a second metering section 210f. The metering section is about 10/20 of the total length. As described above the length to diameter (L/D) ratio is obtained by comparing the length 210g of the screw within the barrel to the diameter 210h of the interior of the barrel. Some prior art screws call for a 10-5-5 profile, where 10 is the feed zone, 5 is the transition zone and 5 is the metering zone. The barrel has a generally uniform diameter across its length. The screw has a root portion 210i, which gradually increases from the hopper end to the nozzle end. The increasing root diameter creates a compression ratio, as the free space between the varying root and the constant diameter barrel wall decreases. General purpose screws typically have a compression ratio of 2.5 to 1. That is, the space near the hopper is measured as having a volume of 2.5 per unit length, whereas the space near the nozzle has a volume of 1 per unit length.

Figure 3:
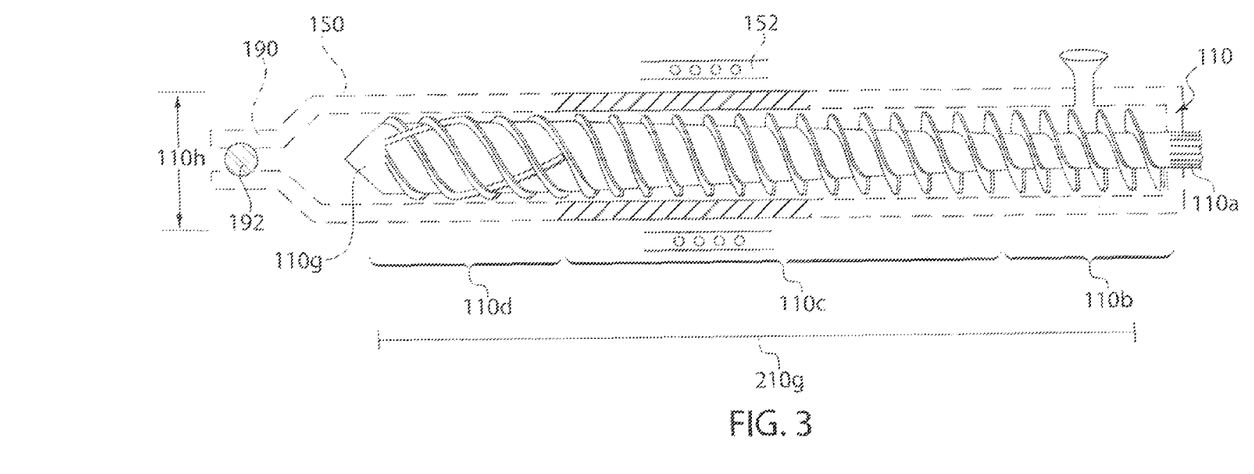
FIG. 3 is an injection molding screw according to an embodiment of the invention.

An embodiment of a screw 110 according to the invention is shown in FIG. 3. The motor and transmission may be mounted on a sled which moves axially with the screw. A splined shaft section 110a is provided for engaging a transmission for rotating screw 110 within barrel 150. The transition zone 110c is configured as about 10/20 of the total length. The transition zone 110c is centrally located along the screw's length, with the feed zone 110b being 5/20 of the length and the metering zone 110d the remaining 5/20 of the length. To provide gentler mixing, the compression ratio is smaller, that is, the space near the hopper is measured as having a volume of about 2.0 to about 2.4 per unit length, whereas the space near the nozzle has a volume of 1 per unit length. To compensate for the lower compression ratio, the transition zone is longer than prior art designs. In some cases, the 10/20 L/D transition zone according to the invention is twice as long as prior art zones.

The screw tip 110g may be provided with a ring, commonly referred to as a non-return ring or ring valve. These non return rings can be configured in a variety of mechanical designs to act as a check valve. In general, the non-return rings provide a gap for resin to flow toward the nozzle end of the barrel as the screw is being retracted away from the nozzle. When the screw is moving toward the nozzle, the ring becomes seated to close the gap. Ring valves may be obtained from Spirex of Youngstown, Ohio. In the invention, references to a screw include screw tips, rings, non-return rings or ring valves. All of these components would be formed as solid, non-coated parts made from a powder metallurgy containing a Cr/V blend above about 20%.

The nozzle 190 may be provided with a valve 192 which is closed while the molten charge is being created, and then opened when the screw is brought forward to inject the resin in to the closed mold cavity. In addition, the barrel may be provided with an end cap. Different size nozzles can be easily attached to the end cap, for example by a threaded connection. The mold is held shut by a mold clamp, designated as the mold-side piston-cylinder unit having a closing force of 100 tons, more than 100 tons and as high as 150 tons. On stationary mold 410, there may be a sprue bushing which is a metal insert in the mold that accepts the nozzle and provides an opening for transferring the plasticized resin. In the invention, references to a "nozzle" include permanent nozzles, removable nozzles, replacement nozzles and end caps. All of these components would be formed as solid, non-coated parts made from a powder metallurgy containing a Cr/V blend above about 20%.

Accordingly the screw according to the invention provides less shear and more gradual plasticization by providing a lower compression ratio in combination with a longer transition zone. This is particularly important when processing amorphous resins like polycarbonate. In contrast to crystalline materials, materials which are amorphous have long polymer chains which gradually begin to loosen up as their temperature increases. Amorphous materials do not have a fixed melting point, but instead have a glass transition temperature where they begin to flow as the polymer chains are able to slide with respect to each other. The converse is the viscosity of a resin, that is, the resistance to flow. For polymers, viscosity is measured as the Melt Index. The Melt Index of common thermoplastics is provided in the following Table 1.

TABLE 1

Melt Index of Common Thermoplastics

| Thermoplastic | Melt Index |
| --- | --- |
| Acrylonitrile Butadiene Styrene | 4 to 40 |
| cyclic olefin resin and co-polymers | 4 to 130 |
| Polyamides included Nylons | 4 to 70 |
| Polycarbonate and Polycarboante-Copolymers | 4 to 70 |
| Polyetherimide | 4 to 113 |
| Polyethersulfone | 4 to 150 |
| Polyethersulfone | 4 to 150 |
| Polyethylene Terephthalate | 3 to 120 |
| Copolyester | 3 to 120 |
| polymethlamethacrylate | 1 to 50 |
| Polystyrene and co-polymers | 1.4 to 40 |
| Polysulfone | 3 to 90 |
| Styrene Acrylonitrile | 4 to 40 |
| Styrene/Butadiene/Styrene | 1.4 to 40 |
| Methyl Methacrylate Styrene | 0.7 to 26 |
| Styrene/Methyl Methacrylate Copolymer | 0.4 to 20 |
| acrylic copolymers | 2 to 20 |
| thermoplastic polyurethanes | 4 to 52 |
| Styrene-Butadiene-methyl methacrylate | 0.7 to 26 |

As described above, ophthalmic lenses manufactured from clear polymer resins constitute defect-critical articles. Thicker lenses like semi-finished lenses have certain challenges because of the longer cycle times needed to produce theses lenses. Other lenses like finished lenses have longer residence times for the resin and may be exposed to greater plasticizing temperatures. In this application including the claims, the phrase "ophthalmic lenses" includes plano lenses, finished lenses, semi-finished lenses, and lenses having functional films like polarized lenses. Clear resins like polycarbonate and thermoplastic polyurethane (TPU) have thermo-mechanical process specifications. Exposing theses resins to excess shear, high temperatures, elevated temperatures over a period of time or a combination of these will exceed process specifications. In other words, the thermo-mechanical history is effected by the combination of shear plus high temperature plus elevated temperatures over a period of time. TPU resins may be processed at temperatures in the range of 210 to 250 degrees C. (410-485 degrees F.). Polycarbonate resins may be processed at temperatures in the range of 250 to 340 degrees C. (485-645 degrees F.) where the lower end of the range is used for semi-finished lenses and the upper end of the range for finished lenses.

Figure 11:
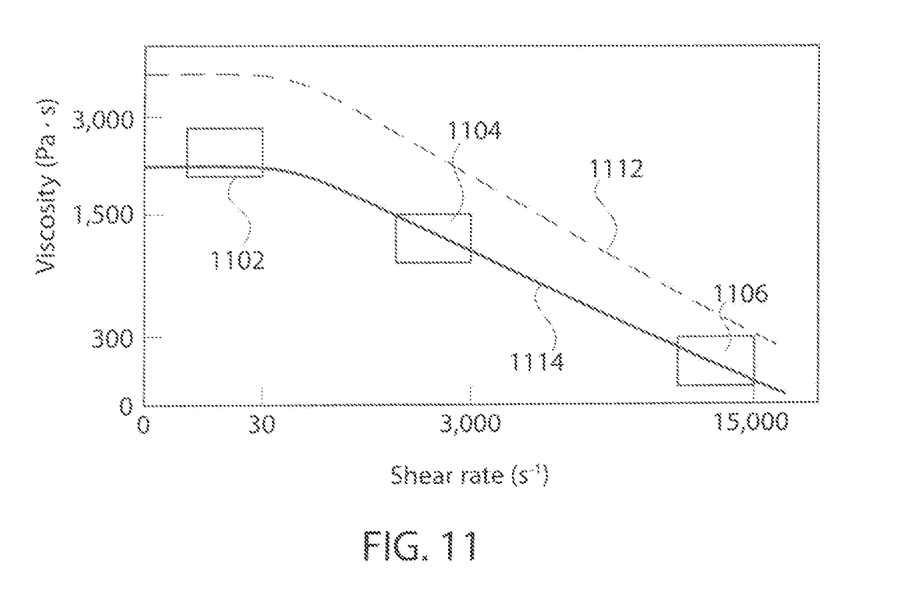
FIG. 11 is a graph showing viscosity vs. shear rate for different temperature curves.

The solid non-coated parts having a Cr/V blend over about 20% reduces chlorine induced degradation, minimizes additive degradation and film formation, and minimized nucleation sites. Therefore viscosity can be controlled by temperature (250-340 degrees C.) allowing the screw configuration and operation to deliver low shear. Within the transition and metering zones, most the bulk of the resin experiences low shear rates in the channel, i.e. the area between the screw root and the barrel. This area will be referred to as "in the channel". Such low shear comprises values below 20-30 s$^{-1}$, for example, between 1 and 20 s$^{-1}$. These processing conditions adjust the resin's viscosity to less than about 2,000-3,000 Pa·s, for example in a range of 1,000 to 2,000 Pa·s. As can be seen in FIG. 11, this Feed Zone target box 1102 shows the 30 s$^{-1}$ and 3,000 Pa·s limits. The shear and viscosity measurements herein are based on material conditions that assume 100% melted resin. Molten polymer primarily exists between the transition zone and the metering zone.

Within the transition and metering zone, in the area between the flights and the inner lining of the barrel medium shear comprises values below 500-750 s$^{-1}$, for example, between 100 and 500 s$^{-1}$. This area will be referred to as "between the flights". These processing conditions adjust the resin's viscosity to less than about 1,000-1,500 Pa·s, for example in a range of 500 to 1,000 Pa·s. In conclusion, the shear rate in the screw should stay low (<500 s$^{-1}$) to avoid any shear heating of the polycarbonate over a long period of time that could lead to thermal degradation during the plasticizing phase. As can be seen in FIG. 11, this Transition Zone target box 1104 shows the 3,000 s$^{-1}$ and 1,500 Pa·s limits.

Shear rate in the barrel may be calculated in the following manner. To measure simple shear we refer to the Couette flow which involves laminar flow of a viscous fluid. The flow occurs between two parallel plates, one moving at a constant speed and the other one stationary. The Shear Rate is defined by Formula 1.

$$\dot{\gamma} = v/h \quad \text{Formula 1}$$

where
$\dot{\gamma}$ is the shear rate (s$^{-1}$).
v is the velocity of the moving plate (m/sec.).
h is the distance between the plates (m).

For measuring the shear rate within the bulk portion of the barrel and over the flights, take the velocity v as the circumference of the barrel (πD) times rpm of the screw (N) rotating with respect to the barrel wall, where the rpm is adjusted for seconds (1/60), resulting in Formula 2.

$$\dot{\gamma} = (\pi D N)/(60 \times h) \quad \text{Formula 2}$$

Conversely, it is desirable to have a high shear rate in the nozzle during the injection phase to rapidly decrease viscosity before entering the mold cavity for a better flow. For example, the shear rate in the nozzle during injection should be higher to use the pseudoplastic properties of polycarbonate. While some localized shear heating is experienced, the mold block acts as a heat sink to quickly dissipate the heat. The shear should be limited to a maximum value of 10,000-15,000 s$^{-1}$. These processing conditions adjust the resin's viscosity to less than about 200-300 Pa·s, for example about 200 Pa·s. As can be seen in FIG. 11, this Nozzle target box 1106 shows the 15,000 s$^{-1}$ and 500 Pa·s limits.

The graph in FIG. 11 shows a low temp PC curve 1112 according to the prior art, where the processing temperature within the barrel was lowered to avoid resin degradation. This is because higher temperatures aggravate all problems relating to thermo-mechanical history. For example, higher resin temperatures within the barrel increases chlorine induced degradation, additive degradation, film formation and nucleation sites for resin deposit. At the lower temperatures, shear had to be increased in order to obtain the target viscosities. However, higher shear also aggravates problems relating to thermo-mechanical history.

According to the invention, all thermo-mechanical problems are alleviated by using the solid, non-coated parts within the resin delivery system. Accordingly, the resin temperature could be safely increased as illustrated by high temp PC curve 1114. The high temp PC curve 1114 shows that shear rates can be maintained below 500-3,000 $s^{-1}$, or below 500-1,000 $^{s-1}$, within the barrel in target boxes 1102 and 1104. Since thermo-mechanical history has been maintained, a higher shear rate can be used at the nozzle to provide beneficial viscosity reduction. The high temp PC curve then shows a high shear rate above 1,000 $s^{-1}$ through the nozzle in target box 1106 with viscosity reduced to the 200-500 Pa·s range.

For measuring resin (i.e. a Newtonian fluid) exiting the nozzle, we use the shear rate at the inner wall of flow within a pipe, as defined by Formula 3.

$$\dot{\gamma}(8v)/d \qquad \text{Formula 3}$$

where
$\dot{\gamma}$ is the shear rate ($s^{-1}$).
v is the linear fluid velocity.
d is the inside diameter of the pipe.

The linear fluid velocity v has a relationship to the volumetric flow rate Q defined by Formula 4.

$$V=Q/A \qquad \text{Formula 4}$$

where
A is $\pi r^2$.
This yields formula 5.

$$V=Q/\pi r^2 \qquad \text{Formula 5}$$

Combining Formula 5 into Formula 4 provides the following Formula 6.

$$\dot{\gamma}=(8v)/d=[8(Q/\pi r^2)]/2r \qquad \text{Formula 6}$$

Formula 6 can be simplified to produce Formula 7.

$$\dot{\gamma}_{ap}=(4Q)/(\pi R^3)=(4v\pi Rb^2)/(\pi R^3) \qquad \text{Formula 7}$$

where
Q is the volume flow rate ($mm^3/s$).
R is the nozzle radius (mm).
Rb is the barrel radius (mm).
v is the injection speed.

The shear rate calculated above can be modified based on the plastic in use as in Formula 8 to take into account the pseudoplastic nature of polymers under high shear rates.

$$\dot{\gamma}_R=[(3m+1)/(4m)]\dot{\gamma}_{ap} \qquad \text{Formula 8}$$

where
m is the "local" pseudoplastic index obtained from rheology data.

The solid non-coated equipment, apparatus and methods according to the invention are useful in manufacturing optical articles, and ophthalmic lenses like plano lenses, finished lenses, tinted lenses, and semi-finished lenses along with lenses having functional films like polarized lenses. Semi-finished lenses are manufactured as thick discs, where particular prescriptions are then cut from the discs to produce custom lenses. For example, optical features such as prism and cylinder are prepared for specific eyeglass wearers on an individual basis. The manufacturing process for these thicker semi-finished lenses requires a longer cycle time, and therefore the lenses are more susceptible to defects than thinner lenses having shorter cycle times. As the cycle time becomes longer, the likelihood increases that the resin's thermo-mechanical history will exceed the process specifications and begin to deteriorate. On the other hand, the resin used to make finished lenses experiences longer residence time in the barrel. Plano lenses and lenses including functional films like polarized films have other production challenges. Generally, theses lenses are made from resin having 99% or greater clear polymer and less than 1% of additive. Additives are typically selected from heat stabilizers, UV blockers, mold release agents, dyes, colorants and combinations thereof. The resulting lenses have a transmission value of at least 85%, for example greater than 90% and preferably about 95%.

Figure 4:
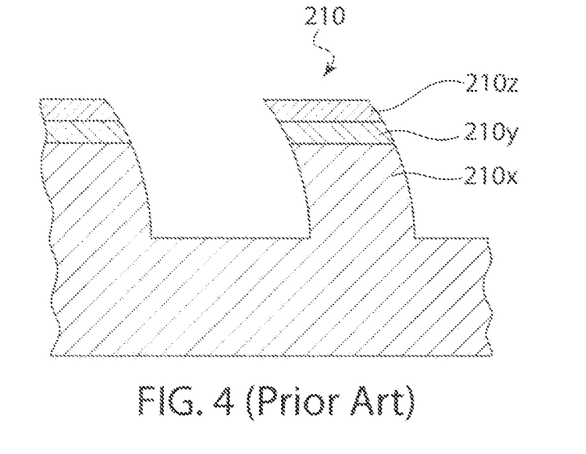
FIG. 4 is a cross-sectional view of a coated screw according to the prior art.

Contamination from various sources is an ongoing problem with rejects in the manufacture of ophthalmic lenses. As described above, polymer films can form on the coated surfaces of the screw, barrel and nozzle. These films reside in the barrel for multiple cycles, which is much longer than intended. As their thermal history exceeds design specifications, the polymer degrades turning yellow then black. Eventually, small pieces of degraded film flake off and end up in the molded parts as black speck contamination. Previously, these films would form on regions of the screw, barrel or nozzle that had experienced some form of corrosion. Initial attempts to solve these problems consisted of coating or chrome-plating the screw. The rational was that chrome provides wear and corrosion resistance. However, the plating itself causes another problem, in that over time it can develop microcracks, whether it is trivalent or hexavalent chromium. While chrome plating provides a chemically resistant surface with improved corrosion resistance, the mechanics of the coating layer are less than ideal, whereby any coating by definition has stress points that lead to fracture. These fracture points then become nucleation sites where polymer can potentially adhere. Once adhered, the polymer remains for multiple cycles where the extended exposure to the heat within the barrel leads to degradation. FIG. 4 shows a cross-sectional view of a coated screw 210 according to the prior art. As described above, basic designs for corrosion resistant screws comprise coating a steel base metal with stainless steel. Attempts to improve the performance of such coated screws led to more layers. FIG. 4 shows a base alloy 210x, coated with an intermediate layer 210y followed by the wear resistant coating 210z. According to U.S. Pat. No. 6,634,781 base alloy 210x may be formed from corrosion resistant alloys such as alloy steels, cast or wrought iron, low and high carbon steels, nickel based alloys and stainless steel. The intermediate layer 210y is referred to as a bond coating layer, undercoating or buttering layer. It may be made from a nickel based alloy that is welded on to the base alloy 210x. The bond coating layer has a coefficient of thermal expansion which is about the same or less than the base alloy, and higher than the wear resistant coating. The wear resistant coating 210z comprises a fused ceramic layer and may include materials such as chromium oxide, aluminum oxide, alumina titania, zirconium oxide, magnesium zirconate, yttria-stabilized zirconium oxide, magnesium aluminate, tungsten carbide, tungsten-chromium carbide, chromium carbide and tungsten-titanium carbide.

According to U.S. Pat. No. 6,786,630 a three layer system comprises a base material 210x, an intermediate layer 210y of magnetically conductive metallic material applied by a thermal spraying process. The wear resistant layer 210z is made up of at least 30% molybdenum or made almost entirely of molybdenum, also applied by a thermal spraying process.

Figure 5:
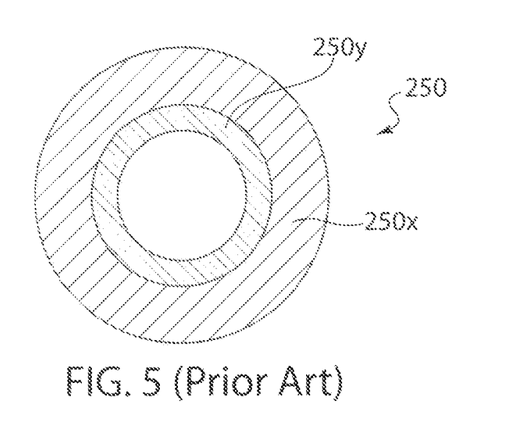
FIG. 5 is a cross-sectional view of a coated barrel according to the prior art.

As can be seen in FIG. 5 the barrel 250 according to the prior art may also be provided with an interior coated layer. According to U.S. Pat. No. 5,565,277 the barrel comprises a bi-metallic construction, with a base metal 250x and a coating layer 250y consisting of microalloyed steel. The preferred micro-alloyed steels contain 0.34 to 0.40% Carbon, 0.15 to 0.80% Silicon, 1.20 to 1.65% Manganese, 0.08 to 0.13% Vanadium and the balance iron. The microalloyed steel was applied via a centrifugal casting process.

Figure 6:
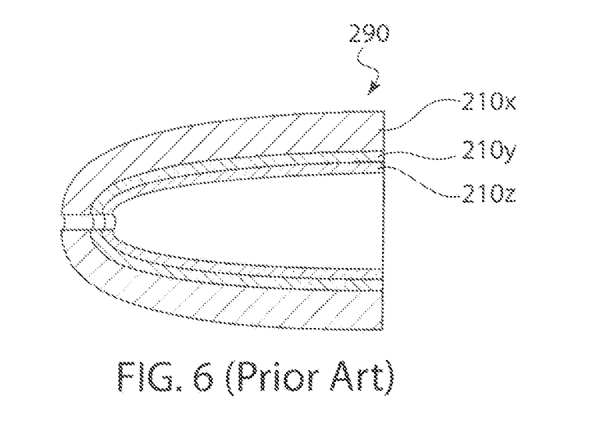
FIG. 6 is a cross-sectional view of a coated nozzle according to the prior art.

As shown in FIG. 6 the prior art also contemplated coating the interior of nozzle 290. According to U.S. Pat. No. 7,134,868 a steel base material 290x is provided. An intermediate layer 290y is coated with a diamond-type layer 290z. The intermediate layer may be made from silicon, titanium or nickel formed by vacuum deposition or chemical vapor deposition. Another option would be molybdenum applied by ionization evaporation if greater adhesion is required. The diamond-type coating can be a composite type (metal and diamond mixture) or a diamond depositing type (amorphous and polycrystalline).

Figure 7:
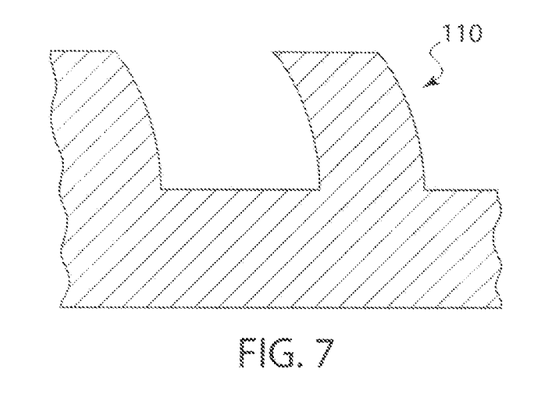
FIG. 7 is a cross-sectional view of an uncoated screw according to an embodiment of the invention.

In contrast to a coated screw 210 of FIG. 4, a screw 110 according to the invention is shown in FIG. 7. Screw 110 is an uncoated screw made from a single material that avoids coating related micro-cracks. More particularly, the screw is made from select stainless steel to form a high wear and corrosion resistant part. The raw materials consist of powder metallurgy steel which provides a monolithic metal with reduced hot spots that resists polymer film formation.

Figure 8:
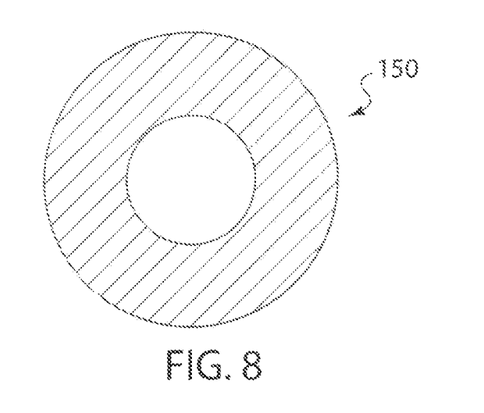
FIG. 8 is a cross-sectional view of an uncoated barrel according to an embodiment of the invention.

In contrast to a coated barrel 250 of FIG. 5, a barrel 150 according to the invention is shown in FIG. 8. Barrel 150 is an uncoated barrel made from a single material that avoids coating related micro-cracks. More particularly, the barrel is made from select stainless steel to form a high wear and corrosion resistant part. The raw materials consist of powder metallurgy steel which provides a monolithic metal with reduced hot spots that resists polymer film formation.

Figure 9:
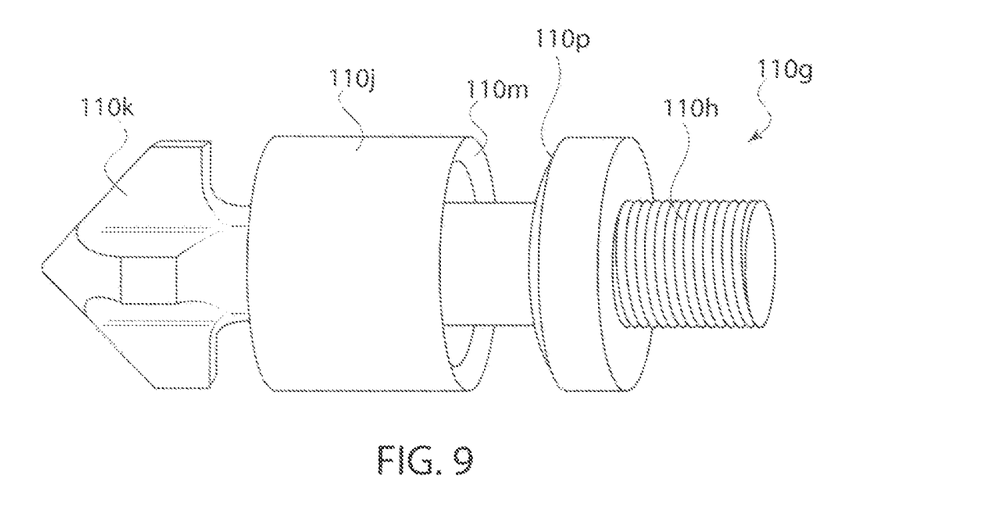
FIG. 9 is a side elevational view of an uncoated screw tip and non-return ring according to an embodiment of the invention.

FIG. 9 shows an enlarged view of removable screw tip 110g. Threads 110h are provided to attach the screw tip to the end of screw 110. Screw tip 110g features a non-return ring 110j which shuttles between the threaded end and the pointed end 110k. During metering, the non-return ring slides to the left allowing resin to pass through the ring. During injection, the rear beveled edge 110m of the non-return ring seats against the shoulder 110p. When seated, the non-return ring prevents resin from flowing past the ring in a direction from left to right incurring that resin is injected through the nozzle at the specified pressure. All components in the screw tip 110 are made from solid, non-coated parts having a Cr/V blend above about 20%.

Figure 10:
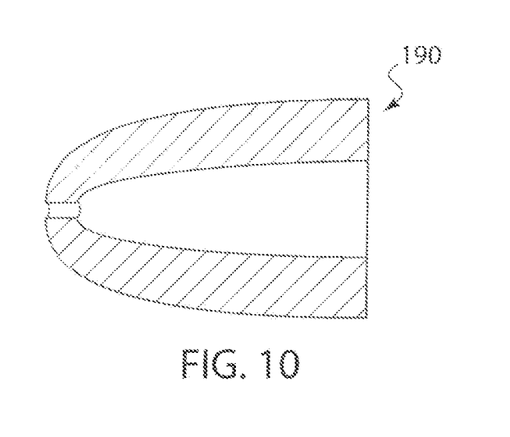
FIG. 10 is a cross-sectional view of an uncoated nozzle according to an embodiment of the invention.

In contrast to a coated nozzle of FIG. 6, a nozzle 190 according to the invention is shown in FIG. 10. Nozzle 190 is an uncoated nozzle made from a single material that avoids coating related micro-cracks. More particularly, the nozzle is made from select stainless steel to form a high wear and corrosion resistant part. The raw materials consist of powder metallurgy steel which provides a monolithic metal with reduced hot spots that resists polymer film formation.

Black Specs at Setup—Uncoated, Corrosion Resistant Melt Delivery System. Very often the onset of black specks occurs at the start of a setup. Setup being defined as the process when the injection molding machine is idle for a duration required for tooling change, and is then re-started with the same or different process (owing to the change in SKU). It is during this phase, when there is an increase in black specks in the melt stream. The reason being that this phase represents a mechanical and thermal shock to the system. There is a change in melt viscosity, and thermal history of the material in the barrel. In addition, the new setup may require a different melt flow rate and/or pressure through the system. All these factors can lead to dislodging of the degraded film, resulting in black specks in the delivered melt. The uncoated, corrosion melt delivery system according to the invention develops less degraded film, and it takes longer for such film to build up. When using prior art coated barrels and screws, black speck contamination could be as high as 10% or higher. By incorporating the solid non-coated barrels and screws, black speck contamination has been reduced considerably to 2% or less. The use of this system effectively reduces the setup time and minimizes rejects during setup due to disruption in the process.

The apparatus and method according to the invention address several problems in injection molding. The high Chromium/Vanadium (Cr/V) blend reduces chlorine induced degradation. The parts which are formed from a powder metallurgy are more monolithic than other metals. This effectively reduces hot spots and makes the material more uniform in composition throughout the parts. This material uniformity and reduced hot spots, help minimize additive degradation and film formation. The solid parts are less susceptible to micro-cracks thereby minimizing nucleation sites for resin deposit and degradation.

By managing the above-noted problems with a resin delivery material solution, the invention then provides for increased processing temperatures of resin within the barrel. Note that prior art solutions call for reduced temperatures to improve resin degradation issues. This combination of solid, non-coated parts and utilization of temperature to control viscosity improves the quality of defect-critical parts, like optical articles and ophthalmic lenses. For example, TPU could be processed with a barrel temperature within a 5-, 10- or 20-degree C. range centered at one of 210 degrees C., 220 degrees C., or 230 degrees C., or 240 degrees C. As a further example, PC for semi-finished lenses could be processed with a barrel temperature within a 5-, 10- or 20-degree C. range centered at one of 260 degrees C., or 270 degrees C., or 280 degrees C., or 290 degrees C. While PC for finished lenses could be processed with a barrel temperature within a 5-, 10- or 20-degree C. range centered at one of 280 degrees C., 300 degrees C., or 320 degrees C.

It should be understood that although the present invention has been described with respect to a polycarbonate base material, the features of the present invention discussed above are equally applicable to any base material used to fabricate optical articles and ophthalmic lenses by injection molding. Such base materials, include, for example, polycarbonate, polyamide, polyimide, polysulfone, copolymers of polyethyleneterephthalate and polycarbonate, polyolefine, homopolymers and copolymers of diethylene glycol bis(allylcarbonate), homopolymers and copolymers of (meth) acrylic monomers, homopolymers and copolymers of thio (meth)acrylic monomers, homopolymers and copolymers of urethane, homopolymers and copolymers of thiourethane, epoxy homopolymers and copolymers, and episulfure homopolymers and copolymers. Such base materials also include materials that are highly sensitive to heat and shear, such as thermoplastic polyurethanes, for example.

It should also be understood that the term "resin" or "resins" as employed herein above include specialty resins in addition to standard resins. Such specialty resins also include UV-400 materials that have higher concentration of UV additives, have a higher yellow index than standard grades and have a higher susceptibility to yellowing upon processing. Such specialty resins further include colored resins and resins with heat and shear sensitive dyes.

Having described preferred embodiments for apparatus and methods for producing articles, for examples ophthalmic lenses, it is noted that modifications and variations can be made by persons skilled in the art in light of the above teachings. It is therefore understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An apparatus for producing defect-critical articles from a molding resin comprising at least 98% clear polymer and additives including a heat stabilizer and a UV blocker in an injection molding machine comprising:
   an injection molding machine having:
     a hopper;
     a resin delivery assembly comprising a hollow cylindrical barrel and a screw rotatably disposed within said barrel and terminating in a nozzle, wherein said resin delivery assembly is made from a powder metallurgy formed into solid non-coated parts having a Chromium-Vanadium (Cr/V) blend over about 20% with no detectable amounts of Nickel (Ni), Tungsten (W) or Sulfur (S); and
     a mold; and
   a molding resin fed from said hopper to said resin delivery assembly and being injected via said nozzle into the mold, wherein between said hopper and said mold, the resin only contacts said solid non-coated parts whereby the resin experiences less degradation and provides improved quality for the defect-critical articles.

2. The apparatus of claim 1, wherein:
   (i) said Cr/V blend reduces chlorine induced degradation of the metallic resin delivery assembly;
   (ii) said powder metallurgy provides a monolithic part which reduces hot spots thereby minimizing additive degradation and film formation; and
   (iii) said solid parts are less susceptible to micro-cracks thereby minimizing nucleation sites for resin deposit and degradation.

3. The apparatus of claim 2, wherein said powder metallurgy further includes about 18% Chromium, about 3% Vanadium, about 1.7% Carbon, about 0.8% Silicon, about 1% Molybdenum, about 0.3% Manganese with no detectable amount of Phosphorus (P).

4. The apparatus of claim 3, wherein said molding resin is selected from the group consisting of polycarbonate, thermoplastic polyurethane, PMMA, PMMA copolymers, polyesters, nylons, PC-polyester blends and PC-polyester copolymers; and wherein the additives further include one of a mold release agent, a dye, and a colorant.

5. The apparatus of claim 4, wherein said defect-critical article is selected from the group consisting of a medical device, storage media, an optical article, and an ophthalmic lens.

6. The apparatus of claim 1, wherein said barrel and screw includes a feed zone, a transition zone, and a metering zone in which said transition zone comprises about 50% of the length of the resin delivery assembly; and wherein said transition zone is centered along the length of the resin delivery assembly, wherein the transition zone provides more gradual melting, improves melt homogeneity and additive blending while avoiding vigorous mixing thereby reducing heat and shear induced degradation and improving the yellowness index of the defect critical article.

7. The apparatus of claim 6, wherein said injection molding machine further includes a heater to control the temperature of the barrel; wherein said screw configuration and operation prevents any molding resin from being subject to shear rates above about 30 s$^{-1}$ within the transition and metering zones, in the channel while said heater maintains a barrel temperature as a function of the molding resin's rheological properties to adjust the molding resin's viscosity below about 2,000 Pa·s.

8. The apparatus of claim 6, wherein said injection molding machine further includes a heater to control the temperature of the barrel; wherein said screw configuration and operation prevents any molding resin from being subject to shear rates above about 750 s$^{-1}$ within the transition and metering zones above the flights while said heater maintains a barrel temperature as a function of the molding resin's rheological properties to adjust the molding resin's viscosity below about 1,000 Pa·s.

9. The apparatus of claim 8, wherein said heater maintains a barrel temperature above 250 degrees C. for polycarbonate and a barrel temperature below 250 degrees C. for thermoplastic polyurethane.

10. The apparatus of claim 1, wherein said resin delivery system includes a screw tip and a non-return ring, and wherein said injection molding machine further includes a screw actuator to move the screw axially within the barrel to prevent the molding resin from being subject to shear rates above about 15,000 s$^{-1}$ as it passes through the nozzle to decrease viscosity below about 500 Pa·s to improve flow into the mold.

11. A method for producing reduced defect articles in an injection molding machine using a molding resin having at least 98% clear polymer and additives including a heat stabilizer and a UV blocker, comprising the steps of:
   plasticizing the molding resin by feeding the molding resin (a) from a hopper (b) along a barrel and screw and (c) through a nozzle;
   injecting the plasticized resin from the nozzle into a closed mold; and
   cooling the plasticized resin until it solidifies to withstand opening of the mold without deforming,
   wherein between the hopper and the mold, the molding resin only contacts solid non-coated parts made from a powder metallurgy material containing a Chromium-Vanadium (Cr/V) blend above about 20% by weight of the material with no detectable amounts of Nickel (Ni), Tungsten (W) or Sulfur (S) thereby producing reduced defect articles.

12. The method of claim 11, wherein the barrel and screw includes a feed zone, a transition zone and a metering zone in which the transition zone comprises about 50% of the length of the barrel and screw, and wherein the transition zone is centered along the length of the barrel and screw, wherein the extended transition zone provides more gradual melting, improves melt homogeneity and additive blending while avoiding vigorous mixing thereby reducing heat and shear induced degradation and improving the yellowness of the article.

13. The method of claim 12, wherein the plasticizing step includes configuring and operating the screw so that the molding resin is not subject to shear rates above about 30 s$^{-1}$ within the transition and metering zones in the channel in combination with setting the temperature within the barrel to adjust the molding resin's viscosity below about 2,000 Pa·s.

14. The method of claim 12, wherein the plasticizing step includes configuring and operating the screw so that the molding resin is not subject to shear rates above about 750 s$^{-1}$ within the transition and feed zones above the flights in combination with setting the temperature within the barrel to adjust the molding resin's viscosity below about 1,000 Pa·s.

15. The method of claim 14, wherein the molding resin comprises polycarbonate and the temperature is set between 250 and 340 degrees C.

16. The method of claim 14, wherein the molding resin comprises thermoplastic polyurethane and the temperature is set between 210 and 250 degrees C.

17. The method of claim 12, wherein the injecting step includes configuring and operating the screw so that the plasticized resin is not subject to shear rates above about 15,000 $s^{-1}$ as it passes through the nozzle to decrease the viscosity below about 500 Pa·s to improve flow into the mold.

18. The method of claim 11, wherein the molding resin is selected from the group consisting of polycarbonate, thermoplastic polyurethane, PMMA, PMMA copolymers, polyesters, nylons, PC-polyester blends and PC-polyester copolymers, and wherein the additives further include one of a mold release agent, a dye, and a colorant.

19. The method of claim 11, wherein the powder metallurgy further includes about 18% Chromium, about 3% Vanadium, about 1.7% Carbon, about 0.8% Silicon, about 1% Molybdenum, about 0.3% Manganese by weight with no detectable amount of Phosphorus (P).

20. The method of claim 11, wherein the defect critical article is selected from the group consisting of a medical device, storage media, an optical article and an ophthalmic lens.

21. The method of claim 11, further including the step of:
placing a functional film into the mold,
prior to the injecting step.

22. The method of claim 11, further including a screw tip and a non-return ring coupled to the screw, wherein the barrel, screw, screw tip, non-return ring and nozzle are all solid non-coated parts made from a powder metallurgy material containing a Chromium-Vanadium (Cr/V) blend above about 20% by weight of the material.

23. The method of claim 11, wherein:
(i) said Cr/V blend reduces chlorine induced degradation of the metallic resin delivery assembly including degradation resulting from chlorine combining with moisture to form hydrochloric acid;
(ii) said powder metallurgy provides a monolithic part which reduces hot spots thereby minimizing additive degradation and film formation; and
(iii) said solid parts are less susceptible to micro-cracks thereby minimizing nucleation sites for resin deposit and degradation.

* * * * *